Aug. 17, 1937.  M. F. RICHARDSON  2,090,486
VALVE
Filed Sept. 28, 1935  2 Sheets-Sheet 1
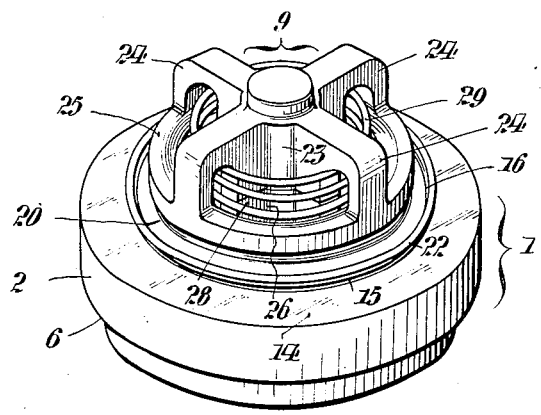
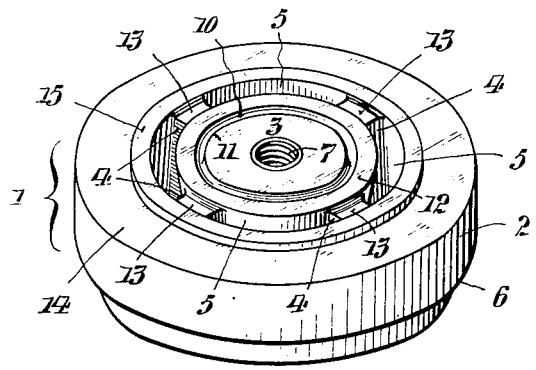
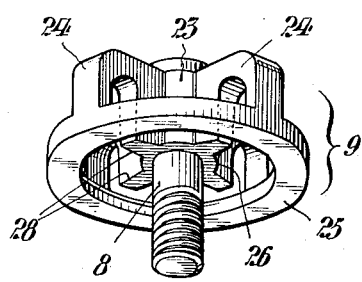
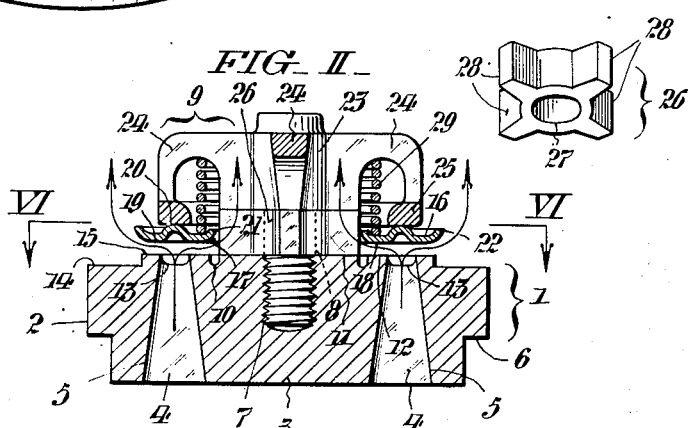
WITNESSES:
INVENTOR:
Maurice F. Richardson
BY
ATTORNEYS.

Aug. 17, 1937.     M. F. RICHARDSON     2,090,486
VALVE
Filed Sept. 28, 1935     2 Sheets-Sheet 2
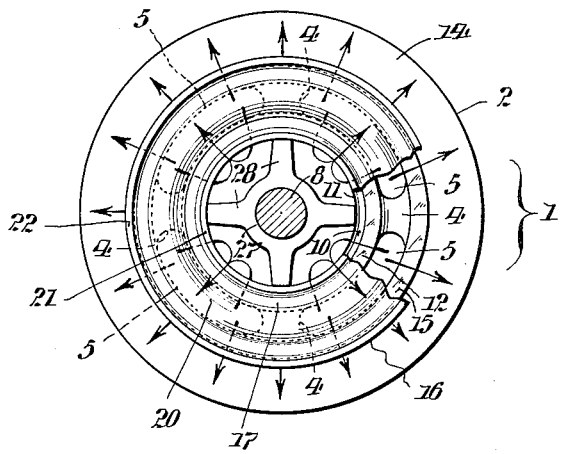

Patented Aug. 17, 1937

2,090,486

UNITED STATES PATENT OFFICE 2,090,486

VALVE

Maurice F. Richardson, Berwyn, Pa.

Application September 28, 1935, Serial No. 42,576

1 Claim. (Cl. 251—144)

This invention relates broadly to disc valves, and more particularly to such valves as are used in pumps and compressors, and which are subject to heavy duty.

The primary object of the present invention is to provide a disc valve of the above indicated type characterized by maximum passage for the gas, air or liquid, whereby the capacity of such valves is greatly increased without impairment of their efficiency.

Another object of this invention is the provision of a center hole disc valve with a spider-like stop or guard means through which the gas, air or liquid can flow freely around both the inner and outer peripheries thereof.

A further object of the invention is to furnish a valve of the indicated class which embodies structural refinements conducive to increased durability.

The foregoing and other objects of this invention will be set forth in the following specification, reference being made to the accompanying drawings, and the novel means by which said objects are effectuated is more specifically expressed in the claim.

In the drawings:

Fig. I is a perspective view of a single-type valve unit embodying the present improvements.

Fig. II is an axial vertical section of the same.

Fig. III is a perspective view of the valve seat.

Fig. IV is a perspective view of the combined valve guard and stem.

Fig. V is a perspective view of a spider-like valve guide hereinafter fully explained.

Fig. VI is a sectional plan, taken approximately as indicated by the arrows VI—VI in Fig. II.

Fig. VII is a sectional view, somewhat similar to Fig. II, of a slightly modified form of the invention; and Fig. VIII is a perspective view of the combined valve guard and stem embodied in the unit of Fig. VII.

In all the views, corresponding parts are designated by the same or similar reference characters excepting where structural distinctions occur.

Referring more in detail to the drawings, and firstly to Figs. I–VI, inclusive, the ported seat-member is comprehensively designated by the reference character 1, the same embodying an outer annular section 2, a central boss 3, and connecting arms 4, to define tapering flow-passage 5 therethrough. The seat-member 1 is also formed with a stop shoulder 6 for forced-fit engagement in the usual partition or pump-chest deck, not shown, or elsewhere as desired. The central boss 3 is axially bored at 7 for reception of the screw-threaded end of the stem 8, of a novel form of valve stop means or guard 9, later on fully described.

The ported seat-member 1, it will be observed, is concentrically grooved at 10 to define a central embossment 11, and an inner annular seating surface 12, while the arms 4 are preferably inset at 13, and the member 1 suitably reduced at 14 to define an outer annular surface 15.

The valve disc 16 is preferably formed from sheet metal to provide a central orifice 17 of comparatively large diameter, and it is provided with inner and outer seating surfaces 18, 19, respectively, said surfaces being separated by an intervening arched ridge 20, while the inner and outer peripheral edges of the valve disc 16 are upwardly-flared or rounded at 21, 22, respectively, to ease operation of the valve.

The spider-like stop means or guard 9, as best understood from Fig. IV, embodies a central portion 23 of "Grecian" cross-formation, for example, with the radially projecting parts or limbs reduced and downwardly arched at 24 to form inverted U-shaped arms or ribs for termination, conveniently although not essentially, in an annular guard-portion 25, which limits the "lift" of the valve disc 16. It is to be particularly remarked that the guard central portion 23 is inset relative to the plane of guard portion 25, and shouldered relative to the stem 8 to form an abutment for a purpose later explained; while said stem is suitably finished for free reception of a removable spider or valve-guide member 26, Fig. V. This valve-guide member 26 embodies a hub-portion 27, with radial arms or ribs 28 substantially conforming to the outlines of the guard central portion 23, while it serves as a jamb means, intermediate said central portion and the seat member embossment 11, for rigidly securing the stop means or guard 9 to the valve seat member 1, in an obvious manner. Furthermore, the arms 28 are, preferably, convergently-tapered radially-outwards to induce "streamline" flow through the valve.

The valve disc 16 is held in place by a helical-spring 29, under compression, intermediate said disc inner circumferential rounding 21 and the under side of the guard means archings 24.

Referring now to the modification of Figs. VII and VIII, which show another form of the valve, it is to be remarked that the removable valve guide element 26 is dispensed with, and that the radial arms 28', of the guard central portion 28', are downwardly extended, as shown, to engage the seat central portion 30. Furthermore, the seat 31 in this form of the invention is axially bored at 32 for passage of the guard stem 33, and said guard is conveniently secured in place by means of a lock nut 34 and cotter pin 35 applied to the lower end of said stem. In all other respects this form of the invention substantially conforms with that previously described; accordingly, corresponding reference characters are employed and further description thereof dispensed with, in order to avoid repetitive explanation. It is to be observed the groove 10 in the seat face is not provided so that the inner seating surface 18 of the valve disc 16 caacts with the outer confines of the central portion 30, in an obvious manner. It is to be particularly noted, however, that by forming the spider valve guide arms 28' as an integral part of the guard 9, as just described, in case of wear or damage occurring to said arms, replacement of the entire guard 9 becomes necessary; whereas by utilizing the removable spider-like guide element 26 of Figs. I-VI, it is only needful to replace same, when worn or damaged, with resultant economical results.

From the foregoing it will be readily understood that valves of the type described whether moving slowly or rapidly will permit a maximum free and uninterrupted flow of the gas, air or liquid therethrough around both the inner as well as the outer peripheries of the disc valves 16, 16', incident to provision of the free passages afforded intervening the radial arms 28, 28', in addition to formation of the stop means or guards 9, 9', as spider-like structures. Furthermore, the free flow being directed radially, as indicated by the arrows in Fig. VI, it will be obvious that a maximum volume of the gas, air, or liquid passes the valve, with each active "pulsation" thereof.

Finally, the merits and advantages of this invention are deemed fully apparent to those skilled in the art, while it will be obvious the inventive ideas set forth may be varied without departure from the scope of said invention as more particularly defined by the following claim.

Having thus described the invention, I claim:

In a valve comprising a ported seat member, a spring-influenced axially-apertured valve disc coactive with the seat member; and stop means in the form of a spider-like structure having an axial stem for its attachment to the seat member, said structure comprising radiating portions in the form of inverted U-shaped radial projections, the outer parts whereof merge into an integrally-formed annular guard ring, and the inner parts convergently-taper outwards with provision of an abutment shoulder, and a removable valve guide member centrally bored for engagement on the axial stem intermediate the shouldered abutment and the valve seat member, said guide member embodying radial ribs of corresponding section for alignment with the spider-like structure U-shaped inner parts, whereby streamlined flow through the valve is induced.

MAURICE F. RICHARDSON.